(12) United States Patent
Miyazawa

(10) Patent No.: US 8,108,472 B2
(45) Date of Patent: *Jan. 31, 2012

(54) ELECTRONIC MAIL SYSTEM

(75) Inventor: Yoshinori Miyazawa, Inagi (JP)

(73) Assignee: Fujitsu Limited, Kawasaki (JP)

( * ) Notice: Subject to any disclaimer, the term of this patent is extended or adjusted under 35 U.S.C. 154(b) by 51 days.

This patent is subject to a terminal disclaimer.

(21) Appl. No.: 11/882,274

(22) Filed: Jul. 31, 2007

(65) Prior Publication Data

US 2007/0282961 A1    Dec. 6, 2007

Related U.S. Application Data

(63) Continuation of application No. 09/587,565, filed on Jun. 5, 2000, now Pat. No. 7,389,322.

(30) Foreign Application Priority Data

Oct. 25, 1999  (JP) .................................. 11-302548

(51) Int. Cl.
   *G06F 15/16* (2006.01)
(52) U.S. Cl. ........... 709/206; 715/700; 715/752; 707/10
(58) Field of Classification Search ................... 709/206
   See application file for complete search history.

(56) References Cited

U.S. PATENT DOCUMENTS

| | | |
|---|---|---|
| 5,632,018 A | 5/1997 | Otorii |
| 5,812,770 A | 9/1998 | Sakai |
| 5,826,022 A | 10/1998 | Nielsen |
| 5,872,925 A * | 2/1999 | Han ................................ 709/206 |
| 5,878,230 A | 3/1999 | Weber et al. |
| 5,938,725 A * | 8/1999 | Hara .............................. 709/206 |
| 5,974,448 A | 10/1999 | Yamauchi et al. |
| 6,047,310 A | 4/2000 | Kamakura et al. |
| 6,182,059 B1 | 1/2001 | Angotti et al. |
| 6,189,026 B1 | 2/2001 | Birrell et al. |
| 6,205,471 B1 | 3/2001 | Gilchrist et al. |
| 6,226,670 B1 | 5/2001 | Ueno et al. |
| 6,349,299 B1 | 2/2002 | Spencer et al. |

(Continued)

FOREIGN PATENT DOCUMENTS

EP        0 721 268 A2    7/1996

(Continued)

OTHER PUBLICATIONS

U.S. Appl. No. 09/587,565, filed Jun. 5, 2000, Yoshinori Miyazawa, Fujitsu Limited.

(Continued)

*Primary Examiner* — Dustin Nguyen
(74) *Attorney, Agent, or Firm* — Staas & Halsey LLP

(57) ABSTRACT

An E-mail terminal device comprises a judging unit which judges whether or not a reply destination mail address extracted from an E-mail received is an address of a mailing list capable of broadcasting the same E-mail to a plurality of destinations at one time, an extracting unit which extracts, when the reply destination mail address is the address of the mailing list, at least one mail address contained in a text of the E-mail received, and a selecting module which displays the at least one extracted mail address as a candidate for a reply destination from which a specified reply destination can be selected. This construction makes it feasible to prevent a reply mail from being mis-transmitted to the mailing list.

5 Claims, 8 Drawing Sheets

U.S. PATENT DOCUMENTS

| | | | |
|---|---|---|---|
| 6,370,567 B1 | 4/2002 | Ouchi | |
| 6,453,327 B1 | 9/2002 | Nielsen | |
| 6,460,074 B1 | 10/2002 | Fishkin | |
| 6,480,885 B1 | 11/2002 | Oliver | |
| 6,493,007 B1 | 12/2002 | Pang | |
| 6,546,416 B1 | 4/2003 | Kirsch | |
| 6,671,718 B1 | 12/2003 | Meister et al. | |
| 6,785,710 B2 * | 8/2004 | Kikinis | 709/206 |
| 6,816,884 B1 | 11/2004 | Summers | |
| 6,816,887 B1 | 11/2004 | Shaw et al. | |
| 7,010,572 B1 | 3/2006 | Benjamin et al. | |
| 2004/0078488 A1 | 4/2004 | Patrick | |

FOREIGN PATENT DOCUMENTS

| | | |
|---|---|---|
| EP | 0 855 640 A1 | 7/1998 |
| JP | 06-334686 | 12/1994 |
| JP | 08030524 | 2/1996 |

OTHER PUBLICATIONS

European Search Report for Application No. 00304938.4 dated Jul. 17, 2006.

Japanese Office Action issued on Sep. 9, 2008 in corresponding Japanese Patent Application No. 11-302548.

Notice of Allowance dated Mar. 14, 2008 for corresponding U.S. Appl. No. 09/587,565.

Office Action dated Aug. 28, 2007 for corresponding U.S. Appl. No. 09/587,565.

Office Action dated May 1, 2007 for corresponding U.S. Appl. No. 09/587,565.

Office Action dated Nov. 17, 2006 for corresponding U.S. Appl. No. 09/587,565.

Office Action dated Jul. 5, 2006 for corresponding U.S. Appl. No. 09/587,565.

Office Action dated Dec. 29, 2005 for corresponding U.S. Appl. No. 09/587,565.

Office Action dated Jul. 12, 2005 for corresponding U.S. Appl. No. 09/587,565.

Office Action dated Aug. 12, 2004 for corresponding U.S. Appl. No. 09/587,565.

Office Action dated May 13, 2004 for corresponding U.S. Appl. No. 09/587,565.

Office Action dated Jan. 23, 2004 for corresponding U.S. Appl. No. 09/587,565.

Office Action dated Jun. 5, 2003 for corresponding U.S. Appl. No. 09/587,565.

* cited by examiner

FIG.4

E-MAIL POSTED TO MAILING LSIT

From:Sankaku<sankaku @ sample.fujitsu.co.jp>
To:Mlist @ sample.fujitsu.co.jp

DEAR SIRS:

PLEASE, CONFIRM YOUR OFFICE AND EXENSION NUMBER BY URL..
IF WRONG, PLEASE GIVE INFORMATION TO ○×
(marux@sample.fujitsu.co.jp) IN GENERAL AFFAIRS SECTION.

http://www.sample.fujitsu.co.jp/db/index.htm

------------------------------------------------

△IN GENERAL AFFAIRS SECTION, GENERAL AFFAIRS
DEPARTMENT, FUJITSU CO., LTD.
Mail To:sankaku@sample.fujitsu.co.jp

70 REPLY DESTINATION SELECTION/CONFIRMATION SCREEN

| PLEASE, CONFIRM WHETHER REPLY DESTINATION IS CORRECT OR NOT ☒ |||
|---|---|---|
| PICK UP REPLY DESTINATION FROM LIST WHEN REPLYING TO DESTINATION EXCLUDING MAILING LIST |||
| NAME | ADDRESS ||
| INTRAOFFICE ML | Mlist @ sample.fujitsu.co.jp ||
| <NAME UNKNOWN> | marux @ sample.fujitsu.co.jp ||
| SANKAKU-SAN | sankaku @ sample.fujitsu.co.jp ||
| | OK | CANCEL |

FIG.8

80 REPLY MAIL EDIT SCREEN

Re:PLEASE CONFIRM-MAIL EDITOR    _ ☐ ✕

MAIL (M)   EDIT (E)   TOOL (T)   HELP (H)

DESTINATION(O)   marux@sample.fujitsu.co.jp    81

CC

TITLE(S)   Re:PLEASE CONFIRM

PROTOTYPE (D)   CREATION OF NEW MAIL ▶   IMPORTANCE:NORMAL ▶   NAME CARD(R)   ATTACHMENT(A)

MIYAZAWA@MINAMITAMA PASO KAITO DAI-YON KAIHATSU

KATSUNORI MIYAZAWA, FORUTH DEVELOPMENT SS PROJECT, FUJITSU PERSONAL COMPUTER
DEVELOPMENTGENERAL CONTROL DEPARTMENT
E-Mail:yaruyaru@mm.paso.fujitsu.co.jp/Nifty-Serve:NAC01135

-THAT'S ALL-

82

ELECTRONIC MAIL SYSTEM

CROSS REFERENCE TO RELATED APPLICATION

This application is a Continuation of application Ser. No. 09/587,565 filed Jun. 5, 2000, now issued U.S. Pat. No. 7,389,322, and incorporated by reference herein.

BACKGROUND OF THE INVENTION

The present invention relates generally to an electronic mail (E-mail) system, and more particularly to an E-mail terminal device, an E-mail transmitting method and a readable-by-computer medium recorded with a program which are capable of preventing an E-mail from being mis-replied (mis-transmitted).

E-mail services have spread most as applications and services in the communication networks over the recent years. The E-mail system is defined as a technology of transmitting and receiving mail data (including character information, voice information and picture information) between E-mail terminal devices connected to communications networks, i.e., between computer terminals such as personal computers (PCs) and between data terminals such as workstations (WSs).

In the E-mail system for exchanging the mail data by way of the E-mails, a transmission of the E-mail from a certain E-mail terminal device to other E-mail terminal device involves the following processes. An address (a mail address) allocated to the other E-mail terminal device is designated, and the mail data are forwarded to the communications network. Then, an E-mail server (an E-mail post) connected to the communications network distributes the E-mails to predetermined mailboxes on the basis of the addresses (transmission destination addresses, or addresses of addressees). The E-mail terminal device on the receiving side takes the E-mail addressed to the device itself out of the mailbox, and this receive the mail data.

This type of E-mail system incorporates, in addition to basic functions such as creating the mail and transmitting/receiving the mail, additional functions such as replying, transferring, saving and further broadcasting functions. This broadcasting function is a service for designating a plurality of addressees (transmission destination addresses) or naming a certain group, and broadcasting at one time the same mail data to the plurality of addressees or to all users (members) of that group given a name at one time. This broadcast facilitates the transmission of the same E-mail to the plurality of other E-mail terminal devices from one single E-mail terminal device with reduced labors of the users.

Note that the existing E-mail system is constructed such that when utilizing the broadcasting function, E-mails as replies (such as answers, comments and so on) to the broadcast E-mail are transmitted to not only the E-mail terminal device having broadcast the mail but also other E-mail terminal devices having received the broadcast mail.

The broadcast for transmitting the same E-mail to the plurality of transmission destinations at one time in the conventional E-mail system, involves the use of a [mailing list]. When transmitting (replying) E-mails in response to one single request by making use of this mailing list, the E-mails are broadcast to all the members (transmitters) registered in that list, and hence this system is most efficient in the case of exchanging opinions and information between the plurality of users.

Thus, the labor for inputting the mail addresses of a multiplicity of unspecified addressees can be saved by utilizing the mailing list when transmitting the information, and the transmission of the information can be simplified. While on the other hand, there might occur an endless chain of mistakes in which the reply mail is mis-transmitted to the address of the mailing list with an intention that the reply mail would have been given to the individual information transmitter having posted to the mailing list, and it follows that the private reply mail is broadcast to all the registered members.

Accordingly, the users are required to confirm the addressee when creating and transmitting the reply mail and designate to a correct address of the addressee, which might lead an increase in load upon the operations of the users and cause a decrease in an efficiency of utilizing the E-mail system.

SUMMARY OF THE INVENTION

Accordingly, it is a primary object of the present invention to provide an E-mail terminal device and a readable-by-computer medium recorded with a program which are capable of preventing a reply mail from being mis-transmitted to a mailing list.

It is another object of the present invention to provide a technology of enhancing an efficiency of utilizing an E-mail system by reducing a load upon operations of the users.

To accomplish the above objects, according to a first aspect of the present invention, an E-mail terminal device comprises a judging unit which judges whether or not a reply destination mail address extracted from an E-mail received is an address of a mailing list capable of broadcasting the same E-mail to a plurality of destinations at one time, an extracting unit which extracts, when the reply destination mail address is the address of the mailing list, at least one mail address contained in a text of the E-mail received, and a selecting module which displays the at least one extracted mail address as a candidate for a reply destination from which a specified reply destination can be selected.

According to a second aspect of the present invention, an E-mail terminal device comprises a first extracting unit which extracts a reply destination mail address from a mail header of an E-mail received, a second extracting unit which extracts at least one mail address contained in a text of the E-mail received, and a selecting module which displays all the extracted mail addresses as candidates for reply destinations from which a specified reply destination can be selected.

According a third aspect of the present invention, the E-mail terminal device according to the second aspect of the invention may further comprise a judging unit which judges whether or not the reply destination mail address is an address of a mailing list capable of broadcasting the same E-mail to a plurality of destinations at one time. The second extracting unit, when the reply destination mail address is judged to be the address of the mailing list, extracts the at least one mail address.

According to a fourth aspect of the present invention, the E-mail terminal device according to the third aspect of the invention may further comprise a storage unit including a mail address book by which whether or not the reply destination mail address extracted from the mail header of the E-mail received is the address of the mailing list, can be judged.

According to a fifth aspect of the present invention, the E-mail terminal device according to the fourth aspect of the invention may further comprise a processing unit which stores, if the mail address extracted from the text of the E-mail received is not registered in the mail address book, a name of this unregistered mail address as a name unknown in the mail address book in a format of corresponding to the mail address.

According to a sixth aspect of the present invention, the E-mail terminal device according to the fifth aspect of the invention may further comprise a display unit for which plays, when visibly displaying all the extracted mail addresses as the reply destination candidates, the name of the mail address extracted from the text of the received E-mail and unregistered in the mail address book as the name unknown in the format of corresponding to the mail address.

According to a seventh aspect of the present invention, a method of transmitting an E-mail comprises a step of judging whether or not a reply destination mail address extracted from an E-mail received is an address of a mailing list capable of broadcasting the same E-mail to a plurality of destinations at one time, a step of extracting, when the reply destination mail address is the address of the mailing list, at least one mail address contained in a text of the E-mail received, and a step of displaying the at least one extracted mail address as a candidate for a reply destination from which a specified reply destination can be selected.

According to an eighth aspect of the present invention, a method of transmitting an E-mail comprises a step of extracting a reply destination mail address from a mail header of an E-mail received, a step of extracting at least one mail address contained in a text of the E-mail received, and a step of displaying the at least one extracted mail address as a candidate for a reply destination from which a specified reply destination can be selected.

According to a ninth aspect of the present invention, the method of transmitting the E-mail according to the eighth aspect of the invention may further comprise a step of judging whether or not the reply destination mail address is an address of a mailing list capable of broadcasting the same E-mail to a plurality of destinations at one time, and a step of extracting, when the reply destination mail address is judged to be the address of the mailing list, the at least one mail address contained in the text of the E-mail received.

According to a tenth aspect of the present invention, the method of transmitting the E-mail according to the ninth aspect of the invention may further comprise a step of judging based on a mail address book whether or not the reply destination mail address extracted from the mail header of the E-mail received is the address of the mailing list.

According to an eleventh aspect of the present invention, the method of transmitting the E-mail according to the tenth aspect of the invention may further comprise a step of storing, if the mail address extracted from the text of the E-mail received is not registered in the mail address book, a name of this unregistered mail address as a name unknown in the mail address book in a format of corresponding to the mail address.

According to a twelfth aspect of the present invention, the method of transmitting the E-mail according to the eleventh aspect of the invention may further comprise a step of displaying, when visibly displaying all the extracted mail addresses as the reply destination candidates, the name of the mail address extracted from the text of the received E-mail and unregistered in the mail address book as the name unknown in the format of corresponding to the mail address.

According to a thirteenth aspect of the present invention, there is provided a readably-by-computer medium recorded with a program comprising a step of judging whether or not a reply destination mail address extracted from an E-mail received is an address of a mailing list capable of broadcasting the same E-mail to a plurality of destinations at one time, a step of extracting, when the reply destination mail address is the address of the mailing list, at least one mail address contained in a text of the E-mail received, and a step of displaying the at least one extracted mail address as a candidate for a reply destination from which a specified reply destination can be selected.

According to a fourteenth aspect of the present invention, there is provided a readably-by-computer medium recorded with a program comprising a step of extracting a reply destination mail address from a mail header of an E-mail received, a step of extracting at least one mail address contained in a text of the E-mail received, and a step of displaying all the extracted mail addresses as candidates for reply destinations from which a specified reply destination can be selected.

According to a fifteenth aspect of the present invention, in the readably-by-computer medium recorded with the program according to the fourteenth aspect of the invention, the program may further comprise a step of judging whether or not the reply destination mail address is an address of a mailing list capable of broadcasting the same E-mail to a plurality of destinations at one time, and a step of extracting, when the reply destination mail address is judged to be the address of the mailing list, the at least one mail address contained in the text of the E-mail received.

According to a sixteenth aspect of the present invention, in the readably-by-computer medium recorded with the program according to the fifteenth aspect of the invention, the program may further comprise a step of judging based on a mail address book whether or not the reply destination mail address extracted from the mail header of the E-mail received is the address of the mailing list.

According to a seventeenth aspect of the present invention, in the readably-by-computer medium recorded with the program according to the sixteenth aspect of the invention, the program further comprise a step of storing, if the mail address extracted from the text of the E-mail received is not registered in the mail address book, a name of this unregistered mail address as a name unknown in the mail address book in a format of corresponding to the mail address.

According to an eighteenth aspect of the present invention, in the readably-by-computer medium recorded with the program according to the seventeenth aspect of the invention, the program may further comprise a step of displaying, when visibly displaying all the extracted mail addresses as the reply destination candidates, the name of the mail address extracted from the text of the received E-mail and unregistered in the mail address book as the name unknown in the format of corresponding to the mail address.

According to the present invention, it is feasible to prevent the reply mail from being mis-transmitted to the mailing list.

As a result, it is possible to prevent such a mistake that the mail having a private content is broadcast to all the members, whereby the privacy can be protected. Further, with a reduction of mis-transmitted E-mails, a futile consumption of resources can be decreased.

Moreover, according to the present invention, the user is cable to simply designate the mail address of the reply destination (the mail address of the addressee), and the E-mail system can be thereby utilized efficiently.

BRIEF DESCRIPTION OF THE DRAWINGS

These objects and advantages of the present invention will become more apparent and more readily appreciated from the following detailed description of the presently preferred exemplary embodiments, taken in conjunction with the accompanying drawings of which:

FIG. 4 is a view showing one example of an E-mail posted to a mailing list;

FIG. 7 is a view showing one example of a reply destination selection/confirmation screen; and FIG. 8 is a view showing one example of a reply mail edit screen.

DETAILED DESCRIPTION OF THE PREFERRED EMBODIMENTS

Next, embodiments of the present invention will hereinafter be described with reference to the accompanying drawings.

[Architecture of E-Mail System]

Figure 1:
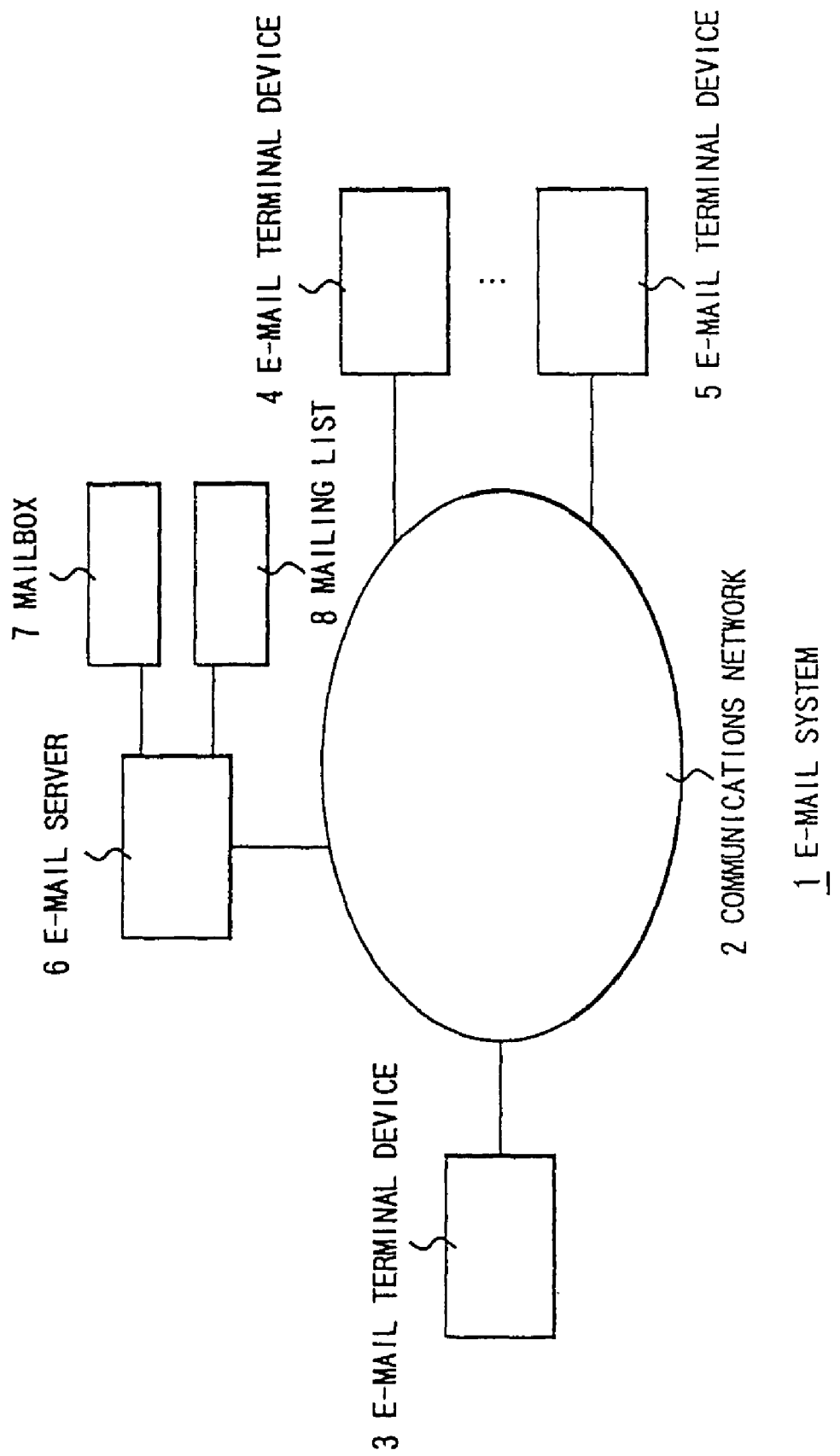
FIG. 1 is a block diagram showing an architecture of an E-mail system in one embodiment of the present invention.

FIG. 1 shows an architecture of an E-mail system in one embodiment of the present invention. Referring to FIG. 1, the E-mail system 1 includes a plurality of E-mail terminal devices 3, 4, . . . , 5 each accommodated in a communications network 2, and an E-mail server (an E-mail post) 6. The communications network 2 is constructed of the Internet and an intraoffice local a real network (LAN).

The E-mail terminal devices 3, 4, . . . , 5 are constructed of computer terminals such as personal computers (PCs) or data terminals such as workstations (WSs). E-mail addresses, which are each unique, are allocated to the respective E-mail terminal devices. Further, each of the E-mail terminal devices has a mail address book. Each of the E-mail terminal devices incorporates E-mail software (programs and data), and transmits and receives an E-mail via the communications network 2 and the E-mail server 6 by starting up the E-mail software. Users can be thereby provided with E-mail services.

The E-mail server 6 contains a mailbox 7 and a mailing list 8, and is constructed of, e.g., Nifty-Serve provided by Nifty Serve Corp. as an E-mail service provider. The mailbox 7 has storage areas allocated for storing mail data per address of a destination of the transmission of the E-mail. The E-mail transmitted from a certain E-mail terminal device to other E-mail terminal device, is stored in the corresponding storage area in the mailbox 7, and the E-mail terminal device serving as the transmission destination reads the mail data from that storage area, thereby completing the transmission and receipt of the E-mail.

Note that the architecture of the E-mail system 1 is, for a simplicity of configuration, that one single E-mail server 6 distributes broadcasting-oriented E-mails which will hereinafter be described in depth.

[Construction of E-Mail Terminal Device]

Figure 2:
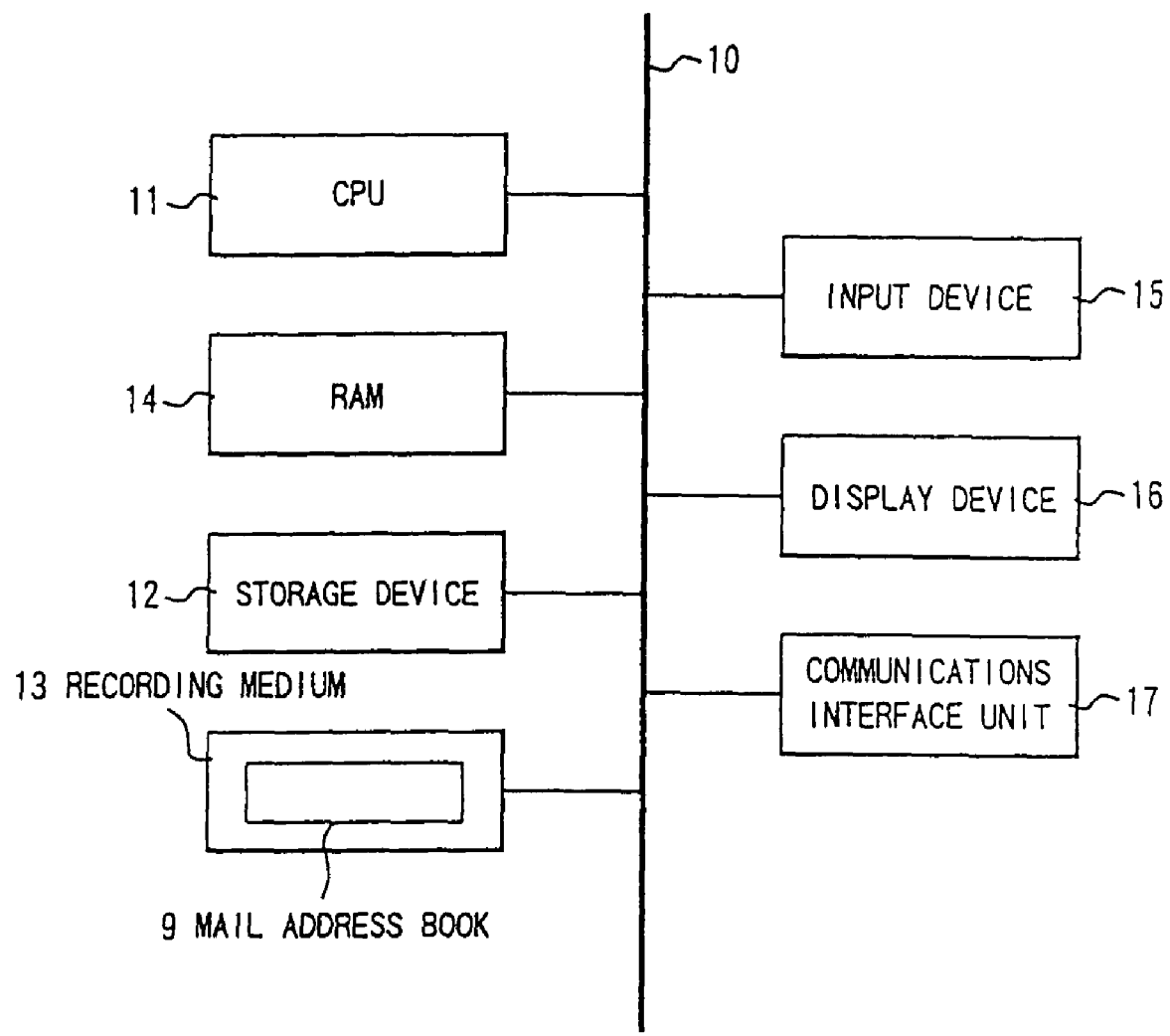
FIG. 2 is a block diagram showing an example of a construction of an E-mail terminal device in FIG. 1.

FIG. 2 illustrates a construction of the E-mail terminal device in the E-mail system 1 described above. Referring to FIG. 2, as in the case of the typical PC, each of the E-mail terminal devices includes a control unit (CPU) 11, a storage device 12 including a recording medium 13, a RAM 14, an input device 15, a display device 16 and a communications interface unit 17, which are connected to each other via an internal bus 10.

The CPU 11 reads from the storage device 12 the existing E-mail program and a processing program which will hereinafter be explained in details (see FIG. 5), and executes these programs. The RAM 14 is used as a main storage area of the CPU 11. The storage device 12 has the recording medium 13 stored previously with the data and the programs executed by the CPU 11. The mail address book 9 is stored on the recording medium 13. This recording medium 13 may take such as form as to be fixedly provided on or detachably attached to the storage device 12.

The input device 15 is constructed of a keyboard and a mouse. The input device 15 is used for creating an E-mail and inputting commands for executing a specified program. The display device 16 is a display for visually displaying a processing result by the CPU 11 to the user. The E-mail terminal device is connected via the communications interface unit 17 to the communications network 2, whereby the E-mail is transmitted and received between the E-mail server 6 and the E-mail terminal device on the basis of indications given from the CPU 11.

[Broadcasting and Replying of E-Mail]

Given next is an explanation of a case where in the E-mail system 1 illustrated in FIG. 1, the E-mail terminal device 3 broadcasts the E-mail to the plurality of E-mail terminal devices 4, . . . , 5 by use of a mailing list 8, and each of the E-mail terminal devices having received the same E-mail replies an E-mail thereto.

Referring to FIGS. 1, 2 and related Figures in combination, in the E-mail system 1, when the user on the side of transmitting the E-mail registers and edits the mail addresses in the E-mail terminal device 3, there are prepared input items for distinguishing whether or not the mail addresses to be registered and edited belong to the mailing list 8, and the user on the transmission side inputs these items.

Figure 3:
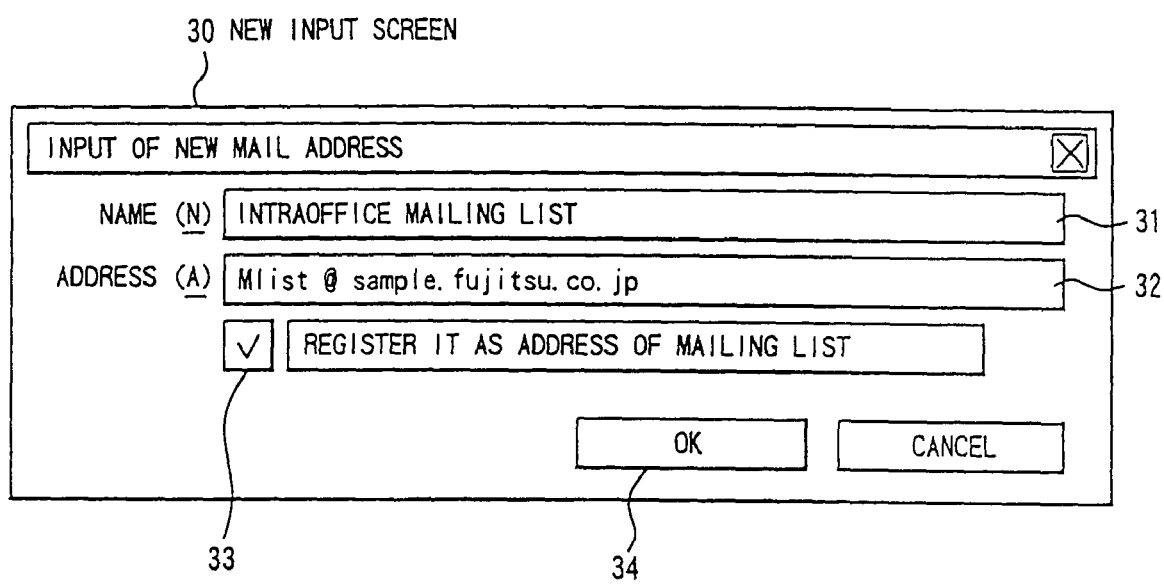
FIG. 3 is a view showing one example of a screen on which a new mail address is inputted.

FIG. 3 shows one example of a new input screen (window) 30 for the mail addresses. The user on the transmission side opens the screen 30 on the display device 16 of the E-mail terminal device 3. On this screen 30, the user inputs respectively [an intraoffice mailing list] in a name (N) column 31 and [Mlist@sample.fujitsu.co.jp] in an address (A) column 32. Thereafter, the user clicks a check box 33 [Register it as an address of the mailing list], and then clicks a command button [OK].

The CPU 11 of the E-mail terminal device 3 transmits contents inputted on the screen 30 to the E-mail server 6 accommodated in the communications network 2 via the communications interface unit 17. The E-mail server 6 registers the mail address received from the E-mail terminal device 3 in the mailing list 8.

Note that mail addresses of a plurality of users (members) are registered, in other processing by the E-mail terminal device 3, in the mailing list 8 designated by a mail address [Mlist@sample.fujitsu.co.jp]. Accordingly, when the E-mail is transmitted to the mail address of the mailing list 8, the same E-mail is distributed (broadcasted) at one time to all the registered members.

FIG. 4 shows one example of the E-mail posted to the mail address which is, as discussed above, registered beforehand in the mailing list 8. A transmitter [Sankaku-san (Δ)] of this mail is a user of the E-mail terminal device 3 having a mail address [sankaku@sample.fujitsu.co.jp]. In this example, the members registered in the mailing list 8 are the users of the E-mail terminal devices 4, . . . , 5. Accordingly, the E-mail shown in FIG. 4, which is transmitted to the mailing list 8 from the E-mail terminal device 3, is broadcast to the plurality of E-mail terminal devices 4, . . . , 5.

Each of the users of the plurality of E-mail terminal devices 4, . . . , 5 executes processes such as downloading and reading the broadcast E-mail by use of a variety of commands based on a protocol like SMTP (Simple Mail Transfer Protocol). As a result, the E-mail is displayed on the display device 16 of each of the E-mail terminal devices, and the users are able to read a content of the E-mail.

Subsequently, each user determines whether or not a reply should be given to that E-mail. In the case of replying, the operation enters an edit mode by inputting a predetermined command in order to create an E-mail for reply (processing step S501 in FIG. 5). In the edit mode, for example, the user of the E-mail terminal device 4 as one of the members starts up a mail editor to send a reply to the individual contributor to the mailing list 8. Upon the startup of the mail editor, a mail edit screen 60 shown in FIG. 6 is displayed on the display device 16 of the E-mail terminal device 4.

On this mail edit screen 60, when the user clicks a [Replay ( )] command column 63 by use of the mouse, the CPU 11 extracts, out of a mail header 61, the mail address [sankaku@sample.fujitsu.co.jp] in the transmitter column (information provider: Sankaku) and the mail address [Mlist@sample.fujitsu.co.jp] in the destination column (S502 in FIG. 5) as mail addresses of replay destinations.

Figure 5:
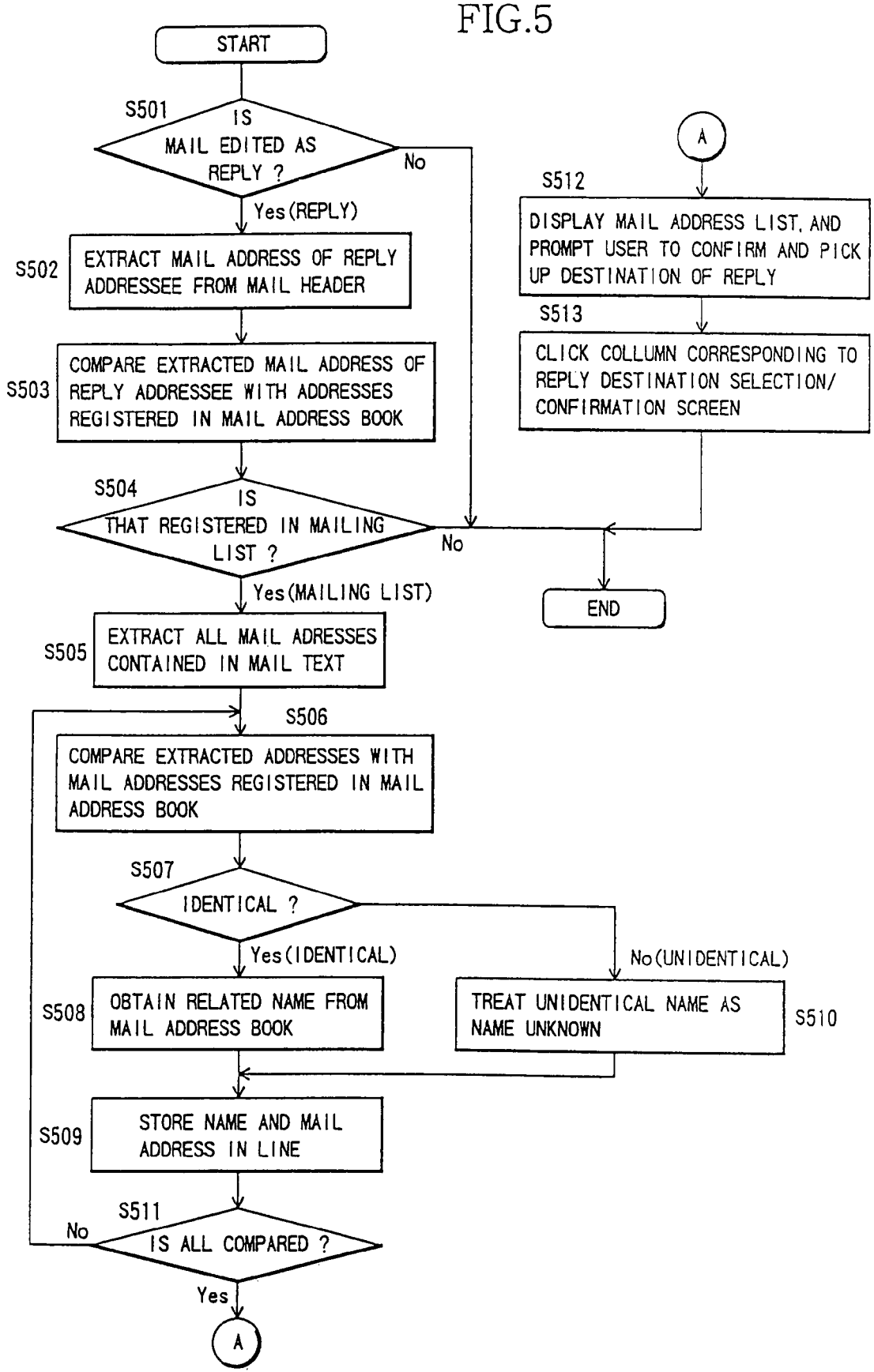
FIG. 5 is a flowchart showing a processing program for preventing a mis-reply.
Figure 6:
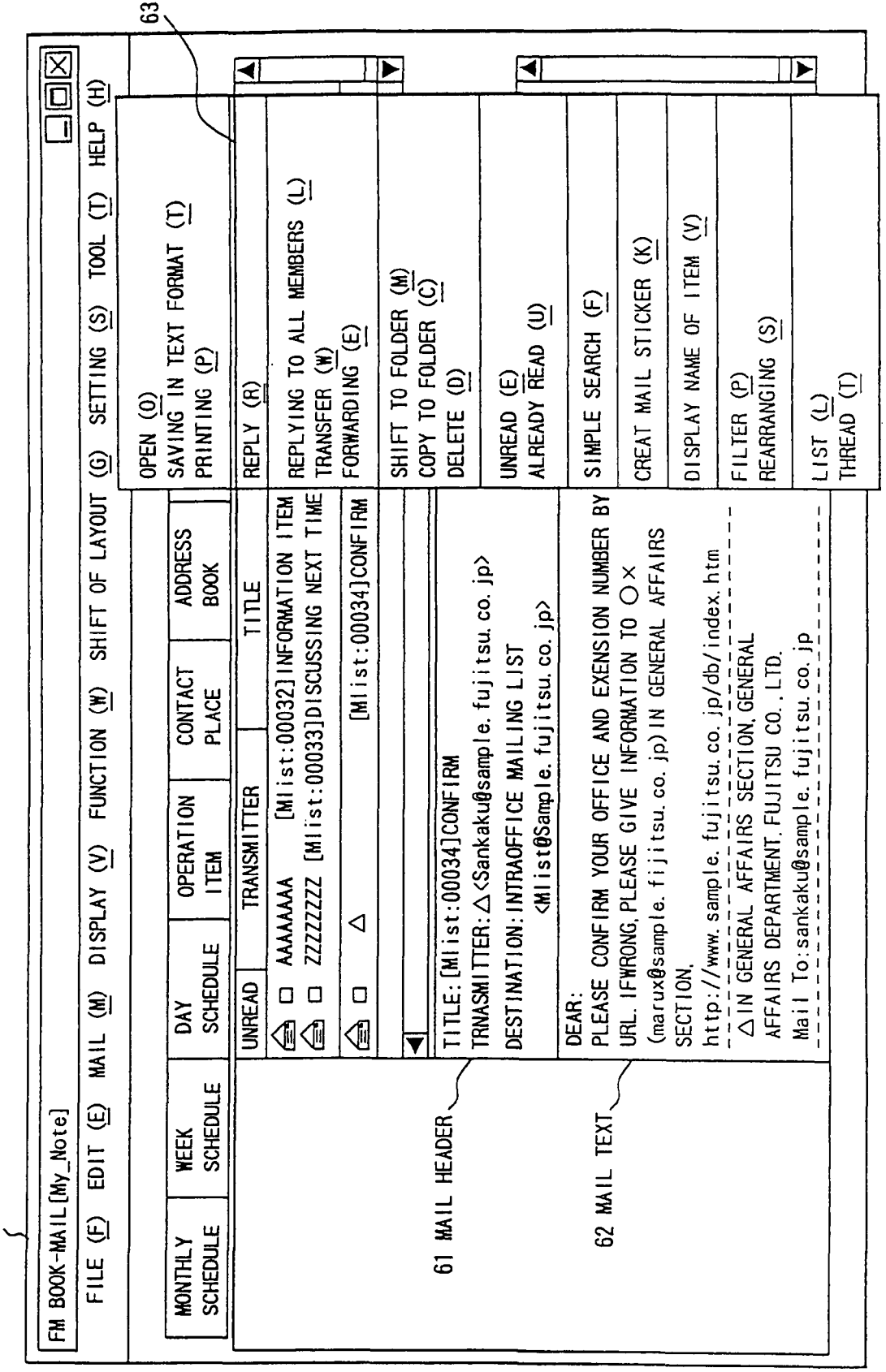
FIG. 6 is a view showing one example of a mail edit screen.

Next, the CPU 11 compares the thus extracted mail addresses of the reply destinations with the addresses registered in the mail address book 9 (S503 in FIG. 5). The CPU 11, based on a result of the comparison in S503, judges whether or not the mail addresses of the reply destinations are registered in the mailing list 8 (S504 in FIG. 5). If registered, the CPU 11 extracts all the mail addresses contained in a reply mail text 62 (which is simply referred to as a mail text 62). More precisely, it follows that the CPU 11 extracts character strings which can be presumed as the mail addresses (S505 in FIG. 5). As a result, the mail addresses [marux@sample.fujitsu.co.jp] and [sankaku@sample.fujitsu.co.jp] are extracted.

The CPU 11 compares all these extracted mail addresses [Mlist@sample.fujitsu.co.jp], [marux@sample.fujitsu.co.jp] and [sankaku@sample.fujitsu.co.jp] with the contents (mail addresses) registered in the mail address book 9 (S506 in FIG. 5).

In this case, the mail addresses [Mlist@sample.fujitsu.co.jp] and [sankaku@sample.fujitsu.co.jp] are identical with the mail addresses registered in the mail address book 9, whereas the mail address [marux@sample.fujitsu.co.jp] is not registered in the mail address book 9 and is not therefore identical with any addresses (S507 in FIG. 5).

Next, the CPU 11 obtains related names ([Intraoffice mailing list] and [Sankaku-san (Δ)] for the identical addresses from the mail address book 9 (S508 in FIG. 5). Then, the CPU 11 stores the names and the mail addresses in a one-to-one correspondence format in the lines of the mail address book 9 (S509 in FIG. 5). Further, the CPU 11 treats the unidentical address obtained in the process in S507 as [Name unknown] because of [Marux (○X)] being unregistered in the mail address book 9 (S510 in FIG. 5). In a process of S509, [Unknown name] of the addressee and the mail address corresponding thereto are stored in the lines of the mail address book 9.

The CPU 11, when finishing the comparison between the all the extracted mail addresses and the contents registered in the mail address book 9 (S511 in FIG. 5), displays those extracted mail addresses in the form of a reply destination candidate list on the display device 16, whereby the users on the receiving side are able to select a reply destination from this list (S512 in FIG. 5). With this processing, a reply destination selection/confirmation screen 70 shown in FIG. 7 is displayed on the display device 16.

In this case, a mail address of the intraoffice mailing list as a reply destination is indicated at a header of the list, and the remaining mail addresses are hereinafter listed up in the sequence of their being extracted. The reply E-mail should be transmitted to only [Marux (○X)] having the mail address [marux@sample.fujitsu.co.jp], and hence the user clicks the corresponding column on the reply destination selection/confirmation screen 70 and further the command button [OK] by manipulating the mouse of the input device 15 (S513) in FIG. 5).

With this operation, the CPU 11 actuates the mail editor and displays a reply mail edit screen 80 shown in FIG. 8 on the display device 16. When this screen 80 is displayed, the mail address [marux@sample.fujitsu.co.jp] is indicated in a destination (O) 81 in the address column. The user creates the mail text 82 for the reply on the screen 80, and thereafter inputs a transmission command for the reply mail (S514 in FIG. 5).

As a result, the mail address of the individual person [Marux-san (○X)] as a reply destination can be picked up from the reply destination candidate list on the reply destination selection/confirmation screen 70, and a mis-transmission (a mis-reply) to the mailing list 8 can be thereby prevented.

Note that the CPU 11, if not coincident with the judging condition in the processes in S501 and S504, exits this processing program.

As discussed above, the contrivance in this embodiment is that it is judged whether or not the reply destination mail address is registered as the address of the mailing list, and, if registered as the address of the mailing list, the mail address contained in the mail text is picked out. The present invention is not limited to this method.

Namely, in the case of creating the reply mail without judging whether it is the address of the mailing list or not (skipping over the processes in S503 and S504 in FIG. 5), there may be taken such a contrivance that the mail addresses contained in the mail header and text of the mail received are displayed as reply destination candidates on the display device 16.

With this contrivance being taken, the user is able to simply specify the mail address of a reply destination (a transmitting destination mail address) of the E-mail, whereby the E-mail system can be utilized efficiently.

Although only a few embodiments of the present invention have been described in detail above, those skilled in the art will readily appreciate that many modifications are possible in the preferred embodiments without departing from the novel teachings and advantages of the present invention. Accordingly, all such modifications are intended to be included within the scope of the present invention as defined by the following claims.

What is claimed is:

1. A method of broadcasting an electronic mail to e-mail terminal devices connected with a communications network, comprising:

receiving an electronic mail transmitted by using a mailing list address;

determining whether one of reply destination addresses included in the electronic mail received in the receiving is a destination address predefined as the mailing list address in a mail address book; and sending a reply in response to the electronic mail to an e-mail terminal device corresponding to only a designated address that is selected from among a display of said reply destination addresses presented when preparing said reply prior to said sending, and wherein the designated address is indicated only when said determining indicates that the one of reply destination addresses is the mailing list address predefined in the mail address book.

2. A method of transmitting an electronic mail, comprising:

determining whether one of reply destinations of an electronic mail received by using a mailing list address is part of a mail address book having multiple predefined destination addresses; and selecting, when preparing a reply, a destination address from among a display of the reply destinations subsequent to said determining and transmitting a reply in response to the electronic mail received only to the destination address selected, wherein the destination address is indicated only when said determining indicates that the one of addresses reply destinations is one of the predefined destination addresses in the mail address book.

3. The method of claim 1, wherein the mail address book includes destination addresses relating to the mailing list address, and destination addresses of the mail address book are identified prior to receipt of the electronic mail in the receiving.

4. The method of claim 1, wherein the designated address is selected by a user from a candidate list identifying each of said destination addresses.

5. The method of claim 1, comprising:

determining, prior to said sending, whether said designated address selected from among the display matches one of the reply destination addresses of the mailing list address predefined in the mail address book.

* * * * *